US00RE48981E

(19) United States
(12) Reissued Patent
Taneichi

(10) Patent Number: US RE48,981 E
(45) Date of Reissued Patent: Mar. 22, 2022

(54) THRUST NUT

(71) Applicant: Simpson Strong-Tie Company Inc., Pleasanton, CA (US)

(72) Inventor: Kaoru Taneichi, Atsugi (JP)

(73) Assignee: Simpson Strong-Tie Company Inc., Pleasanton, CA (US)

(21) Appl. No.: 15/789,927

(22) Filed: Oct. 20, 2017

Related U.S. Patent Documents

Reissue of:
(64) Patent No.: 9,163,655
Issued: Oct. 20, 2015
Appl. No.: 14/154,537
Filed: Jan. 14, 2014

(51) Int. Cl.
*F16B 37/08* (2006.01)
*F16B 43/00* (2006.01)

(52) U.S. Cl.
CPC ..... *F16B 37/0807* (2013.01); *F16B 37/0857* (2013.01); *F16B 43/00* (2013.01)

(58) Field of Classification Search
CPC .. F16B 37/0807; F16B 37/0857; F16B 43/00; F16B 37/0864
USPC ..... 411/267, 270, 277, 278
See application file for complete search history.

(56) References Cited

U.S. PATENT DOCUMENTS

| | | | |
|---|---|---|---|
| 179,994 | A | 7/1876 | Brallier |
| 487,721 | A | 12/1891 | De Kalb |
| 518,165 | A | 4/1894 | Thalaker |
| 560,554 | A | 12/1895 | Wiestner |
| 573,452 | A | 12/1896 | Delahunt |
| 582,424 | A | 12/1896 | Hunt |
| 581,551 | A | 4/1897 | Green |
| 601,249 | A | 3/1898 | Geise |
| 807,021 | A | 12/1905 | Falk |
| 856,868 | A | 6/1907 | Heffner |
| 901,681 | A | 10/1908 | Collet |
| 991,517 | A | 5/1911 | Kennedy |

(Continued)

FOREIGN PATENT DOCUMENTS

| | | |
|---|---|---|
| CA | 2313735 | 3/2001 |
| CA | 2364582 | 2/2010 |

(Continued)

OTHER PUBLICATIONS

US 5,961,265 A, 10/1999, Kato (withdrawn)

(Continued)

*Primary Examiner* — William C Doerrler
(74) *Attorney, Agent, or Firm* — James R. Cypher; Charles R. Cypher

(57) ABSTRACT

A nut main body has a slanted hole with a smaller inner end portion having a plurality of stepped portions of differing height. This gives the slanted hole a differing depth relative to a large-diameter end portion of the slanted hole at a plurality of locations about a circumference of the slanted hole. A plurality of nut segments are slidable within the slanted hole and come into contact with at least one of the stepped portions. The nut segments have screw threads at an inner wall surface. A washer is provided at a large-diameter side of the plurality of nut segments. A bias spring is attached within the nut main body so as to urge the plurality of nut segments towards the small-diameter side of the nut main body with the washer therebetween. A stopper piece holds the bias spring within the nut main body.

20 Claims, 20 Drawing Sheets

(56) References Cited

U.S. PATENT DOCUMENTS 1,005,227 A 10/1911 Jones
1,018,490 A 2/1912 Hall
1,045,562 A 11/1912 Kennedy
1,072,361 A 9/1913 Rickman
1,185,765 A 6/1916 Brooks
1,264,189 A 4/1918 Keator
1,347,687 A 12/1919 Ellis et al.
1,344,417 A 6/1920 Lovekin
1,374,713 A 4/1921 Bell
1,435,028 A 11/1922 Stewart
1,447,515 A 3/1923 Miller
1,539,348 A 5/1925 Botscheller
1,589,307 A 6/1926 Svebili
1,737,543 A 11/1929 Schaefer
1,746,978 A 2/1930 Winkler
1,867,296 A 7/1932 Woodruff
1,918,378 A 7/1933 Burnham
1,940,545 A 12/1933 Holmes
1,953,354 A 4/1934 Holland-Letz
1,966,780 A 7/1934 Wyrick
2,021,051 A 11/1935 Desbrueres
2,066,541 A 1/1937 Schenk
2,103,601 A 12/1937 Stigall
2,214,756 A 9/1940 Walsh
2,261,537 A 11/1941 Zamarra
2,264,480 A 12/1941 Owen
2,294,745 A 9/1942 Goetz
2,366,401 A 1/1945 Haskell
2,367,480 A 1/1945 Beswick
2,405,889 A 8/1946 Kennedy
2,449,846 A 9/1948 Gilman
2,576,579 A 11/1951 Donovan
2,587,560 A 2/1952 Widmer
2,625,815 A 1/1953 Black
2,649,625 A 8/1953 Johnson
2,650,844 A 9/1953 Shemorry
2,685,812 A 8/1954 Dmitroff
2,687,788 A 8/1954 Rapp
2,689,987 A 9/1954 Berger
2,690,682 A 10/1954 Passman
2,772,560 A 12/1956 Neptune
2,896,496 A 7/1959 Jansen
3,021,794 A 2/1962 Knox
3,042,161 A 7/1962 Meyer
3,088,784 A 5/1963 Melton et al.
3,104,645 A 9/1963 Harrison
3,115,804 A 12/1963 Johnson
3,118,681 A 1/1964 Fuehrer
3,151,652 A * 10/1964 Zahodiakin ..... F16B 5/0208 411/267
3,151,653 A * 10/1964 Zahodfakin ..... F16B 5/0208 411/267
3,153,333 A 10/1964 Chisholm
3,157,215 A 11/1964 Zahodiakin
3,157,966 A 11/1964 Shelburne
3,160,188 A 12/1964 Frank
3,161,174 A 12/1964 Harrison
3,174,386 A 3/1965 Lewis
3,187,621 A 6/1965 Turner
3,219,373 A 11/1965 Sutliff
3,224,591 A 12/1965 Sawyer
3,236,144 A 2/1966 Taylor
3,285,120 A 11/1966 Kartiala
3,306,154 A 2/1967 Bailey
3,325,175 A 6/1967 Lower
3,352,341 A * 11/1967 Schertz ..... F16B 37/0864 411/270
3,372,523 A 3/1968 Hall
3,378,891 A 4/1968 Metz
3,391,514 A 7/1968 Hall
3,429,092 A 2/1969 Perry et al.
3,440,334 A 4/1969 Blomstrand
3,443,351 A 5/1969 Kumazawa
3,469,492 A 9/1969 Dahl
3,476,010 A 11/1969 Markey
3,479,897 A 11/1969 Holthofer
3,509,670 A 5/1970 Boll et al.
3,514,917 A 6/1970 Merrill, Sr.
3,517,470 A 6/1970 Luebkeman
3,540,762 A 11/1970 Dunlap
3,579,938 A 5/1971 Hanson
3,613,201 A 10/1971 Herbenar
3,693,312 A 9/1972 Miller
3,695,139 A 10/1972 Howe
3,722,165 A 3/1973 Forsberg et al.
3,742,809 A 3/1973 Zifferer
3,724,151 A 4/1973 Kaywood
3,728,933 A 4/1973 Grube
3,769,774 A 6/1973 Barnes
3,764,157 A 10/1973 LeBlanc
3,782,061 A 1/1974 Minutoli et al.
3,797,336 A 3/1974 Howe
3,798,866 A 3/1974 Werstein
3,842,709 A 10/1974 Fuqua
3,843,080 A 10/1974 Imai et al.
3,844,137 A 10/1974 Zugel
3,850,535 A 11/1974 Howlett et al.
3,861,814 A 1/1975 Fisher
3,867,804 A 2/1975 Wilson
3,870,332 A 3/1975 Eaton
3,878,757 A 4/1975 Puklus, Jr.
3,884,004 A 5/1975 Douma et al.
3,889,916 A 6/1975 Ilukowicz
3,896,599 A 7/1975 Werstein et al.
3,927,497 A 12/1975 Yoshinaga et al.
3,935,685 A 2/1976 Howlett
3,948,141 A 4/1976 Shinjo
3,960,047 A 6/1976 Liffick
4,000,591 A 1/1977 Courtois
4,000,681 A 1/1977 Coldren
4,007,563 A 2/1977 Nakagawa
4,007,564 A 2/1977 Chisholm
4,011,397 A 3/1977 Bouche
4,020,734 A 5/1977 Bell
4,037,516 A 7/1977 Hart
4,047,463 A 9/1977 Coldren
4,055,875 A 11/1977 Strickland
4,083,162 A 4/1978 Regan
4,083,393 A 4/1978 Okada
4,117,643 A 10/1978 Lamothe
4,118,910 A 10/1978 McSherry et al.
4,146,951 A 4/1979 Howlett
4,149,446 A 4/1979 Spengler
4,157,876 A 6/1979 Digiulio
4,169,569 A 10/1979 Riegler et al.
4,172,606 A 10/1979 Howe
4,195,709 A 4/1980 Gianotti et al.
4,239,489 A 12/1980 Ellman et al.
4,249,426 A 2/1981 Erickson et al.
4,250,681 A 2/1981 Helderman
4,261,598 A 4/1981 Cornwall
4,271,654 A 6/1981 Jungbluth
4,286,482 A 9/1981 Marsch
4,287,807 A 9/1981 Pacharis et al.
4,325,575 A 4/1982 Holt et al.
4,363,164 A * 12/1982 Okada ..... B25B 27/14 29/270
4,370,018 A 1/1983 Lane
4,378,187 A 3/1983 Fullerton
4,403,561 A 9/1983 Schaeflern et al.
4,408,940 A 10/1983 Fischer
4,433,879 A 2/1984 Morris
4,445,303 A 5/1984 Judkins
4,479,747 A 10/1984 Pagel
4,509,724 A 4/1985 Okada
4,604,014 A 8/1986 Frano
4,650,276 A 3/1987 Lanzisera et al.
4,665,672 A 5/1987 Commins
4,684,284 A 8/1987 Bradley, Jr.
4,701,065 A 10/1987 Orosa
4,703,711 A 11/1987 Haynes
4,708,555 A 11/1987 Terry
4,720,223 A 1/1988 Neights
4,726,561 A 2/1988 Worzala, Jr.

(56) References Cited

U.S. PATENT DOCUMENTS 4,729,703 A 3/1988 Sato
4,761,860 A 8/1988 Krauss
4,801,231 A 1/1989 Everman
4,812,096 A 3/1989 Peterson
4,823,528 A 4/1989 Faw
4,848,454 A 7/1989 Spears
4,850,777 A 7/1989 Lawrence et al.
4,875,314 A 10/1989 Boilen
4,887,948 A 12/1989 Calmettes
4,896,985 A 1/1990 Commins
4,909,012 A 3/1990 Thompson, Jr. et al.
4,911,726 A 3/1990 Warkentin
4,919,122 A 4/1990 Kohlenbrenner
4,922,771 A 5/1990 Campbell
4,930,959 A 6/1990 Jagelid
4,936,843 A 6/1990 Sohngen
4,945,704 A 8/1990 Brown, Jr.
4,954,032 A 9/1990 Morales
4,974,888 A 12/1990 Childers
4,979,857 A 12/1990 Wing
5,015,132 A 5/1991 Turner
5,015,133 A 5/1991 Arena
5,048,243 A 9/1991 Ward
5,050,364 A 9/1991 Johnson et al.
5,056,764 A 10/1991 Mochizuki
5,067,844 A 11/1991 Bowner et al.
5,081,811 A 1/1992 Sasaki
5,085,547 A 2/1992 Vanotti
5,090,855 A 2/1992 Terry
5,100,275 A 3/1992 Schirrmacher
5,118,237 A 6/1992 Wright
5,139,381 A * 8/1992 Lubreski ..... F16B 37/0857 411/267
5,168,681 A 12/1992 Ayrapetyan
5,180,268 A 1/1993 Richardson
5,197,176 A 3/1993 Reese
5,199,835 A 4/1993 Turner
5,205,690 A 4/1993 Roth
5,207,543 A 5/1993 Kirma
5,228,250 A 7/1993 Kesselman
5,249,404 A 10/1993 Leek
5,254,016 A 10/1993 Ganthier
5,261,198 A 11/1993 McMillan
5,265,326 A 11/1993 Scribner
5,308,184 A 5/1994 Bernard
5,316,319 A 5/1994 Suggs
5,324,150 A 6/1994 Fullerton
5,340,252 A * 8/1994 Weddendorf ..... F16B 37/0864 411/267
5,340,258 A 8/1994 Simon
5,347,771 A 9/1994 Kobori et al.
5,347,777 A 9/1994 Sudduth
5,364,214 A 11/1994 Fazekas
5,365,715 A 11/1994 Steinmetz et al.
5,370,483 A 12/1994 Hood
5,375,384 A 12/1994 Wolfson
5,378,100 A 1/1995 Fullerton
5,379,563 A 1/1995 Tinsley
5,384,993 A 1/1995 Phillips
5,386,748 A 2/1995 Kilgore
5,398,475 A 3/1995 Kraus
5,411,347 A 5/1995 Bowmer et al.
5,427,488 A 6/1995 Fullerton et al.
5,428,936 A 7/1995 Roth
5,466,015 A 11/1995 Berenter
5,468,105 A 11/1995 Iwamoto
5,487,632 A 1/1996 Hood
5,505,026 A 4/1996 Intilla
5,522,688 A 6/1996 Reh
5,531,054 A 7/1996 Ramirez
5,535,561 A 7/1996 Schuyler
5,540,530 A 7/1996 Fazekas
5,558,481 A 9/1996 Park
5,568,711 A 10/1996 Popp et al.
5,570,549 A 11/1996 Lung et al.
5,575,129 A 11/1996 Goto
5,582,496 A 12/1996 Ambrico
5,605,423 A 2/1997 Janusz
5,606,839 A 3/1997 Baumann
5,628,161 A 5/1997 Giannuzzi et al.
5,632,129 A 5/1997 Imai et al.
5,641,256 A 6/1997 Gundy
5,649,798 A 7/1997 Ito
5,653,078 A 8/1997 Kies et al.
5,653,563 A 8/1997 Ernst et al.
5,661,935 A 9/1997 Erickson et al.
5,664,389 A 9/1997 Williams
5,667,181 A 9/1997 Van Leeuwen et al.
5,678,375 A 10/1997 Juola
5,704,572 A 1/1998 Vogel
5,718,090 A 2/1998 Wei-Hwang
5,722,645 A 3/1998 Reitter
5,729,952 A 3/1998 Dahl
5,733,084 A 3/1998 Fullerton
5,740,651 A 4/1998 Vanotti
5,743,670 A 4/1998 Adler
5,746,556 A 5/1998 Sato
5,769,581 A 6/1998 Wallace
5,772,372 A 6/1998 Lins et al.
5,782,048 A 7/1998 Ramirez
5,809,719 A 9/1998 Ashton et al.
5,815,999 A 10/1998 Williams
5,816,762 A 10/1998 Miura et al.
5,819,484 A 10/1998 Kar
5,829,531 A 11/1998 Hebert
5,839,321 A 11/1998 Siemons
5,885,034 A 3/1999 Fergusson
5,906,361 A 5/1999 Carranza
5,921,042 A 7/1999 Ashton et al.
5,931,618 A 8/1999 Wallace
5,937,609 A 8/1999 Roth
5,944,467 A 8/1999 Yuta
5,957,644 A 9/1999 Vaughan
5,967,691 A 10/1999 Lancelot, III
5,979,130 A 11/1999 Gregg et al.
5,987,828 A 11/1999 Hardy
5,988,965 A 11/1999 Fiorell et al.
5,992,126 A 11/1999 Ashton et al.
6,007,284 A * 12/1999 Taneichi ..... E04B 1/2604 411/267
6,019,556 A 2/2000 Hess
6,026,618 A 2/2000 Locke et al.
6,062,784 A 5/2000 Wisser et al.
6,068,250 A 5/2000 Hawkins
6,073,642 A 6/2000 Huang
6,079,179 A 6/2000 Shoemaker, Jr.
6,099,196 A 8/2000 Lancelot, III
6,112,486 A 9/2000 Ashton et al.
6,120,723 A 9/2000 Butler
6,135,687 A 10/2000 Leek et al.
6,139,113 A 10/2000 Seliga
6,151,850 A 11/2000 Sorkin
6,155,019 A 12/2000 Ashton et al.
6,158,188 A 12/2000 Shahnazarian
6,161,339 A 12/2000 Cornett, Sr. et al.
6,161,350 A 12/2000 Espinosa
6,167,785 B1 1/2001 Penner
6,168,455 B1 1/2001 Hussaini
6,176,051 B1 1/2001 Sorkin
6,192,647 B1 2/2001 Dahl
6,195,949 B1 3/2001 Schuyler
6,240,697 B1 6/2001 Thompson et al.
6,244,806 B1 6/2001 Kato
6,250,041 B1 6/2001 Seccombe
6,256,960 B1 7/2001 Babcock et al.
6,257,813 B1 7/2001 Tanimura
6,279,877 B1 8/2001 Davis
6,282,994 B1 9/2001 Wei
6,295,773 B1 10/2001 Alty
6,309,158 B1 10/2001 Bellinghausen et al.
6,327,829 B1 12/2001 Taguchi
6,327,831 B1 12/2001 Leek
6,341,452 B1 1/2002 Bollinghaus
6,350,093 B1 2/2002 Petersen et al.

(56) References Cited

U.S. PATENT DOCUMENTS 6,361,260 B1 3/2002 Schirrmacher
6,367,205 B2 4/2002 Cornett, Sr.
6,389,767 B1 5/2002 Lucey et al.
6,390,747 B1 5/2002 Commins
6,406,240 B1 6/2002 Potter
6,425,220 B1 7/2002 Ashton et al.
6,494,654 B2 12/2002 Espinosa
6,513,290 B2 2/2003 Leek
6,513,300 B1 2/2003 James
6,546,678 B1 4/2003 Ashton et al.
6,564,519 B2 5/2003 Lucey et al.
6,585,469 B2 7/2003 Commins
6,625,945 B2 9/2003 Commins
6,679,024 B2 1/2004 Dahl
6,688,058 B2 2/2004 Espinosa
6,688,071 B1 2/2004 Evers et al.
6,712,574 B1 * 3/2004 Roopnarine ..... F16B 37/0857 411/267
6,745,649 B1 6/2004 Liao
6,773,002 B2 8/2004 Adoline et al.
6,773,198 B2 8/2004 Copping
6,826,882 B2 12/2004 Lucey et al.
6,854,944 B2 2/2005 Hoffmann et al.
6,860,693 B2 3/2005 Jones
6,880,433 B1 4/2005 Tanimura
6,904,728 B2 6/2005 Stutts
6,925,773 B2 8/2005 Gregel et al.
6,942,440 B2 9/2005 Unverzagt et al.
6,951,078 B2 10/2005 Espinosa
6,959,902 B2 11/2005 Leahy
6,964,115 B2 11/2005 Kim
7,007,432 B2 3/2006 Commins
7,037,060 B2 5/2006 Commins
7,127,969 B2 10/2006 Hsieh
7,144,530 B2 12/2006 Ward et al.
7,150,132 B2 12/2006 Commins
7,159,366 B2 1/2007 Espinosa
7,171,789 B2 2/2007 Lucey et al.
7,174,679 B1 2/2007 Mueller
7,287,355 B2 10/2007 Commins
7,296,382 B2 11/2007 Sack
7,316,533 B2 1/2008 Tanimura
7,331,745 B2 2/2008 Giehl
7,340,867 B2 3/2008 Espinosa
7,416,375 B2 8/2008 Virdee
7,422,404 B2 9/2008 Kitamura et al.
7,445,192 B2 11/2008 Gridley et al.
7,467,787 B2 12/2008 Adoline et al.
7,509,778 B2 3/2009 Leek
7,516,582 B2 4/2009 Leek
7,559,178 B2 7/2009 Lucey et al.
7,617,642 B2 11/2009 Espinosa
7,634,888 B2 12/2009 Cloyd et al.
7,665,258 B2 2/2010 Espinosa
7,669,333 B2 3/2010 Van Rijn
7,744,322 B2 6/2010 Kaneichi
7,752,824 B2 7/2010 Brown et al.
7,762,030 B2 7/2010 Espinosa
7,766,299 B2 8/2010 Titus, II et al.
7,802,940 B2 9/2010 Parker
7,891,645 B2 2/2011 Schroeder
7,905,066 B2 3/2011 Pryor et al.
7,946,086 B2 5/2011 Hammer et al.
7,971,411 B2 7/2011 Commins
8,051,615 B2 11/2011 Mathews et al.
8,112,955 B2 2/2012 Espinosa
8,132,767 B2 3/2012 Oh et al.
8,136,318 B2 3/2012 Espinosa
8,186,924 B1 5/2012 Espinosa
8,201,381 B2 6/2012 Heath
8,257,004 B2 9/2012 Smith
8,267,628 B2 9/2012 Noce et al.
8,276,334 B2 10/2012 Mathews et al.
8,281,528 B2 10/2012 Clarke
8,397,454 B2 3/2013 Commins et al.
8,434,725 B2 5/2013 Oh et al.
8,453,412 B2 6/2013 Toedte
8,511,019 B2 8/2013 Espinosa
8,534,974 B2 9/2013 Smith
8,590,247 B2 11/2013 Cooke
8,621,816 B1 1/2014 Lin et al.
8,646,339 B2 2/2014 Smith
8,708,629 B2 4/2014 Smith
8,806,835 B2 8/2014 Espinosa
8,881,478 B2 11/2014 Gray et al.
8,943,777 B2 2/2015 Espinosa
8,998,155 B2 4/2015 Oh
9,062,452 B2 6/2015 Espinosa
9,097,000 B2 8/2015 Espinosa
9,097,001 B2 8/2015 Espinosa
9,181,691 B2 11/2015 Thompson
9,188,147 B2 11/2015 Smith
9,222,251 B2 12/2015 Espinosa
9,239,073 B2 1/2016 Taneichi
9,303,399 B2 4/2016 Espinosa
9,303,676 B2 4/2016 Oh
9,303,677 B2 4/2016 Espinosa
9,388,841 B2 7/2016 Allmon et al.
9,394,706 B2 7/2016 Lin
9,416,530 B2 8/2016 Espinosa
9,447,574 B2 9/2016 Espinosa
9,567,741 B2 2/2017 Espinosa
9,702,139 B2 7/2017 Espinosa
9,874,009 B2 1/2018 Espinosa
9,915,277 B2 3/2018 Oh
10,202,753 B2 2/2019 Espinosa
10,221,557 B2 3/2019 Espinosa
2002/0037205 A1 * 3/2002 Taneichi ..... F16B 37/0857 411/267
2002/0092383 A1 7/2002 Nezigane
2002/0094231 A1 7/2002 Lee
2002/0189175 A1 12/2002 Lancelot et al.
2003/0230032 A1 12/2003 Shahnazarian et al.
2004/0096292 A1 5/2004 Duran et al.
2005/0097843 A1 5/2005 Giesel et al.
2005/0238460 A1 * 10/2005 Li ..... F16B 37/0864 411/432
2005/0284057 A1 12/2005 Commins
2006/0133912 A1 6/2006 Commins
2006/0137285 A1 6/2006 Brown
2008/0060296 A1 3/2008 Espinosa
2008/0292391 A1 11/2008 Spence et al.
2009/0226281 A1 * 9/2009 Taneichi ..... F16B 37/0857 411/433
2009/0272067 A1 11/2009 Gilham
2010/0037554 A1 2/2010 Oh
2011/0182697 A1 7/2011 Smith
2011/0192111 A1 8/2011 White et al.
2013/0000235 A1 1/2013 Espinosa
2016/0244960 A1 8/2016 Espinosa
2017/0023048 A1 1/2017 Espinosa
2017/0037627 A1 2/2017 Espinosa
2018/0135676 A1 5/2018 Taneichi
2018/0187705 A1 7/2018 Oh
2019/0063059 A1 2/2019 Espinosa
2019/0161959 A1 5/2019 Espinosa

FOREIGN PATENT DOCUMENTS

CH 684648 11/1994
DE 102009039822 A1 3/2011
EP 0352542 1/1990
EP 1103734 3/2004
EP 1536149 1/2008
FR 1332745 6/1963
GB 383460 11/1932
GB 558302 12/1943
GB 590430 7/1947
GB 752272 7/1956
GB 901681 7/1962
GB 1099472 1/1968
GB 1384511 2/1975
GB 2201216 8/1988
GB 2262583 6/1993

(56) References Cited

FOREIGN PATENT DOCUMENTS

| | | | |
|---|---|---|---|
| GB | 2404708 | | 9/2005 |
| JP | 46001521 | | 1/1971 |
| JP | 59140604 | | 9/1984 |
| JP | 62135703 | | 8/1987 |
| JP | 2200936 | | 8/1990 |
| JP | 476136 | | 3/1992 |
| JP | 5230893 | | 9/1993 |
| JP | 781325 | | 8/1995 |
| JP | 9317030 | | 12/1997 |
| JP | 1998-009244 | | 1/1998 |
| JP | 2001214534 | | 8/2001 |
| JP | 2002106535 | A | 4/2002 |
| JP | 2002168222 | A | 6/2002 |
| JP | 4201219 | | 10/2008 |
| JP | 4201219 | B2 * | 12/2008 |
| JP | 4531585 | | 6/2010 |
| JP | 4531585 | B2 * | 8/2010 |
| JP | 2010196355 | | 9/2010 |
| JP | 201247244 | | 3/2012 |
| JP | 201364415 | | 4/2013 |
| JP | 2013234731 | | 11/2013 |
| JP | 5912829 | | 4/2016 |
| SU | 706586 | | 12/1979 |
| SU | 796498 | | 1/1981 |
| WO | WO 1999/024724 | | 5/1999 |
| WO | WO 2004/002702 | | 1/2004 |
| WO | WO 2006/055905 | | 5/2006 |
| WO | WO 2008/016543 | | 2/2008 |
| WO | WO 2008/105045 | | 9/2008 |
| WO | WO 2008/124578 | | 10/2008 |
| WO | WO 2010/090736 | | 8/2011 |
| WO | WO 2010/090748 | | 8/2011 |
| WO | WO 2011/111087 | | 9/2011 |
| WO | WO 2011/150537 | | 12/2011 |
| WO | WO 2013/020027 | | 2/2013 |

OTHER PUBLICATIONS

"Device Keeps Shear Walls Tight," magazine, published at least as early as May 2000, pp. 49-50, Circle Reader Service #1263, Rura Builder, Iola, WI.

"Inquest Engineering: Manufacturers of the Earthbound System: Redefining the state of the art in seismic holdown technology," brochure, published at least as early as Jan. 21, 1998, 4 pages, InQuest Engineering, L.L.C., Woodinville, WA.

Greenwood, Douglas C. ed., "Product Engineering Design Manual," manual, 1959, title and copyright page, pp. 90-97, 316-329, McGraw-Hill Book Company, Inc., New York, NY.

Richardson, Arthur B., "Declaration," legal document, Dec. 21, 2002, 7 pages, Mill Valley, CA; and Exhibits A-Q, 82 pages.

"Expansion Jack Washer," brochure, 1999, 1 page, Anchor Tiedown Systems, Inc., Mill Valley, CA and Burien, WA.

"Thru-Bolt Log Fastening System," webpage, 1999, 1 page, Heritage Log Homes, Kodak, TN.

"Earthbound Seismic Holdown System Using The 'Impasse Device'," evaluation report, Nov. 1, 1997, 6 pages, ER-5378, ICBO Evaluation Service, Inc., Whittier, CA.

"The Impasse Devise," webpage, 1997, 1 page, InQuest Engineering, Woodinville, WA.

"LocTite Automatic Self-Locking Nuts," brochure, Oct. 1992, 6 pages, LocTite, Kennesaw, GA.

"Auto Take-Up," webpage, 2000, 4 pages, Zone Four LLC, San Leandro, CA.

"AT Auto Take-Up," brochure, Mar. 28, 2001, 2 pages, Commins Manufacturing Inc., Friday Harbor, WA.

"ATS-Components," webpage, submitted Jun. 28, 2010, 2 pages, Simpson Strong-Tie Co., Inc., Pleasanton, CA.

Commins, Al. "Acceptance Criteria for Shrinkage Compensating Devices and Similar Devices," report draft, Dec. 9, 1999, 3 pages, Commins Design LLC, Friday Harbor, WA.

"Evaluation Report," report, Dec. 10, 1999, 5 pages, ER-XXX, ICBO Evaluation Services, Inc., Whittier, CA.

"AT Auto Take-Up," brochure, Jan. 3, 2000, 1 page, Commins Design LLC, Friday Harbor, WA.

"Our Solution to Wood Shrinkage Solves Shearwal Problems," brochure, Jan. 2000, 2 pages, Tech Note #1, Commins Design LLC, Friday Harbor, WA.

Commins, Alfred, "Shrinkage Compensator for Building Tiedowns," provision patent application, Sep. 24, 1999, 31 pages, U.S. Appl. No. 60/156,042, USA.

Commins, Alfred D., "Automatic Take-Up Device," disclosure, Feb. 10, 1997, 5 pages, Simpson Strong-Tie Company, Inc., Pleasanton, CA.

Commins, Alfred D., "Automatic Take-Up Device," disclosure, Aug. 15, 1996, 7 pages, Simpson Strong-Tie Company, Inc., Pleasanton, CA.

Commins, Alfred D., "Automatic Take-Up Device," disclosure, Mar. 6, 1996, 3 pages, Simpson Strong-Tie Company, Inc., Pleasanton, CA.

"Acceptance Criteria for Shrinkage Compensating Devices," evaluation report, 2005, 5 pages, AC316, ICC Evaluation Service, Inc., Whittier, CA.

Commins, Alfred D., "Automatic Take-Up Device," disclosure, Mar. 6, 1996 and Jan. 25, 1996, 5 pages, Simpson Strong-Tie Company, Inc., Pleasanton, CA.

Commins, Alfred D., "Automatic Take-Up Device," disclosure, Dec. 20, 1995, 3 pages, Simpson Strong-Tie Company, Inc., Pleasanton, CA.

"Connectors for Wood Construction", catalog, 1987, 2 pages, C87H-1, Simpson Strong-Tie Company, Inc., Pleasanton, CA.

"Strong-Tie Rod System", catalog, Nov. 2002, 2 pages, C-HW02, Simpson Strong-Tie Company, Inc., Pleasanton, CA.

"Cinch Nut Shrinkage Compensation Device: Models CN6, CN7, CN8 and CN10," evaluation report, Oct. 1, 2006, 4 pages, ESR-2190, ICC Evaluation Service, Inc., Whittier, CA.

"Structural Tie Down System," product data sheet, installation instructions, and SBCCI Report No. 9916, 1999, 18 pages, Probolt, Orlando, FL.

"Quake-Tie: The Superior Hold-Down Solutoin," brochure, Jan. 1998 and Jan. 20, 1997, 9 pages, Seismic Solutions, Inc., Glen Ellen, CA.

"Blue Banger Hanger: Pre-Poured Concrete Steel Deck Inserts," webpage, accessed Jan. 26, 2012, 2 pages, Construction Engineered Attachment Solutions (CEAS), USA.

"The PT Anchor," webpage, 2009, 2 pages, Chainring Construction Products LLC, Portland, OR.

* cited by examiner

THRUST NUT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a thrust nut that includes a plurality of nut segments that slide in an axial direction and are screwed together with a screw portion of a bolt by being rotated in a fastening direction, after the bolt is inserted to a predetermined position.

2. Description of the Related Art

This type of thrust nut of the past is configured by: a nut main body of which an outer wall is formed into a polygonal shape and that has a slanted hole in an inner wall that successively becomes smaller in diameter; a stopper piece that has a bolt insertion hole and is formed in an end portion on a large-diameter side of the nut main body; three guide pieces that are formed in an axial-center direction on an inner wall surface of the nut main body; three nut segments that are attached between the guide pieces such as to be slidable in the axial-center direction and on an inner wall surface of which threads are formed that are screwed together with the bolt; a flange-shaped attachment piece that is fixed to an end portion on the small-diameter side of the nut main body, prevents detachment of the three nut segments, and projects further outward than an outer circumferential portion of the nut main body; and a bias spring that is housed within the nut main body such as to urge the three nut segments towards the small-diameter side of the nut main body at all times.

The thrust nut, configured as described above, is configured such that the three nut segments are screwed together with a screw portion of a bolt by being inserted into the bolt and rotated in a fastening direction. However, there is a problem in that a clearance amounting to a single thread is present or not present at all times.

[Patent Literature 1] Patent Publication No. 4531585

[Patent Literature 2] Patent Publication No. 4201210

SUMMARY OF THE INVENTION

The present invention has been achieved in light of such issues of the past. An object of the present invention is to provide a thrust nut of which fastening operation is easy and handling is easy, in which two or more nut segments are each capable of being urged in a counter-bolt-insertion direction even when a bolt is inserted, screw portions of the two or more nut segments are screwed together with a screw portion of the bolt with certainty by being rotated in a fastening direction, the screwed engagement allows the screw portions of the two or more nut segments to be screwed such as to be continuous with the screw portion of the bolt, and the two or more nut segments can be worked such as to be capable of maintaining a secure screwed state.

The description above, other objects, and novel features of the present invention will become more completely clear when the following description is read with reference to the accompanying drawings.

However, the drawings are mainly for description and do not limit the technical scope of the present invention.

To achieve the above-described object, a thrust nut of the present invention is configured by: a nut main body of which an outer wall is formed into a polygonal shape and that has a slanted hole of which an inner diameter becomes successively smaller, and a small-diameter end portion is formed into two or more stepped portions; two or more nut segments that are slidable within the slanted hole of the nut main body, or which end portions on the small-diameter side come into contact with stepped portions, and pressing projection pieces are formed in end portions on the large-diameter side; screw portions formed on inner wail surfaces of the two or more nut segments such as to be continuous with the nut segments that are in contact with a stepped portion having the smallest diameter; a washer that is provided in the end portions on the large-diameter side of the two or more nut segments; a bias spring that is attached within the nut main body such as to urge the two or more nut segments towards the small-diameter side at all times with the washer therebetween; and a stopper piece that holds the bias spring within the nut main body, in which a bolt insertion hole is formed, and is attached to the nut main body.

Effects of the Invention

As is clear from the description above, the present invention achieves the following effects:

(1) According to a first aspect, the two or more nut segments are each capable of being evenly urged with certainty towards a direction in which the two or more nut segments are screwed together with the screw portion of a bolt, even when the nut main body is thrust onto the bolt. In addition, the screw portion of the bolt and the screw portions of the two or more nut segments can be screwed together such as to be continuous, by rotation in the fastening direction.

Therefore, a secure screwed state can be maintained.

(2) As a result of above-described (1), two or more stepped portions are formed in a small-diameter end portion of the slanted hole of the nut main body. End portions of the nut segments on the small-diameter side are placed in contact with the stepped portions. Therefore, the two or more nut segments can be disposed with certainty such that the screw portions are continuous.

Therefore, attachment of the two or more nut segments into the nut main body can be easily performed.

(3) According to a second aspect, effects similar to (1) and (2) are achieved.

(4)According to a third aspect as well, effects similar to (1) and (2) are achieved. In addition, as a result of the washer that can lock with a fastening member, even when the fastening member contracts, the two or more nut segments move in the fastening direction. Therefore, loosening of the nut can be prevented with certainty.

EXPLANATION OF REFERENCE NUMBERS

Figure 1:
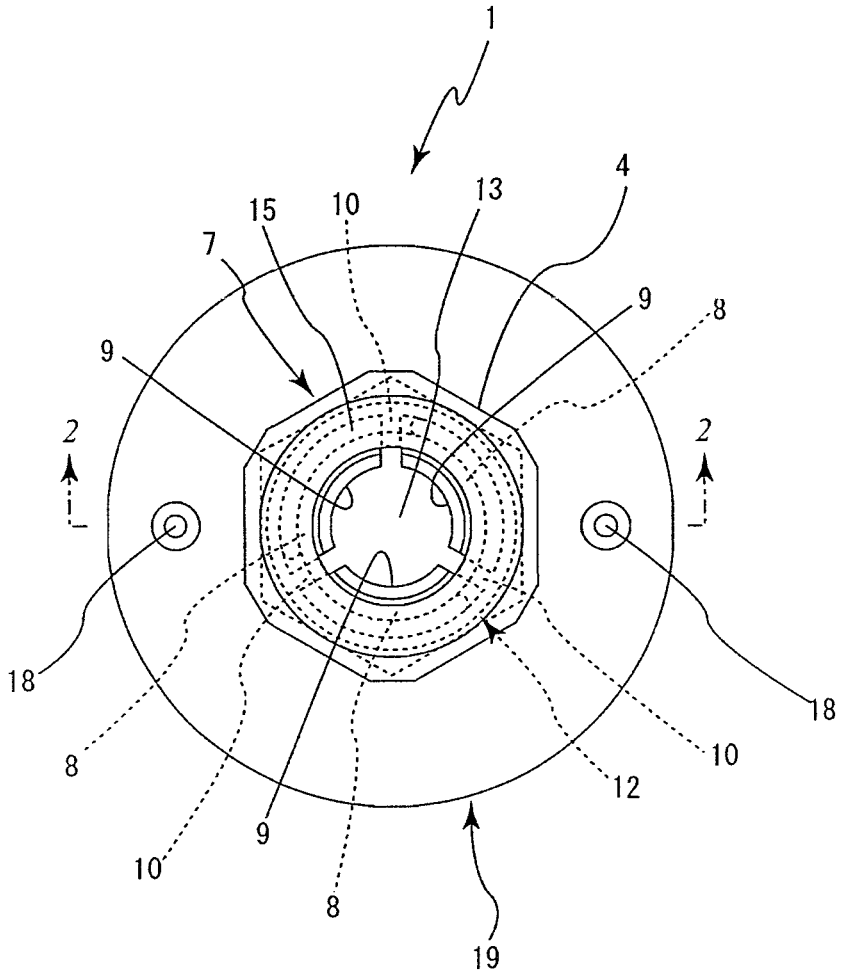
FIG. 1 is a planar view of a first embodiment for carrying out the present invention.
Figure 2:
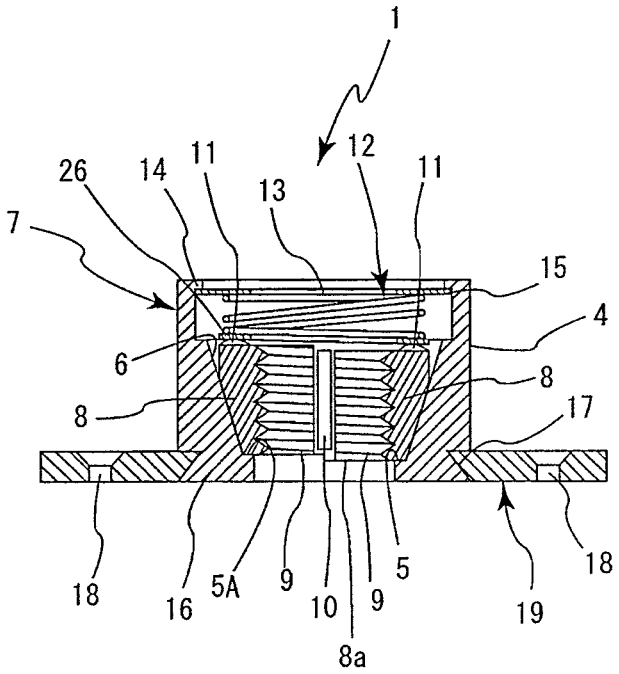
FIG. 2 is a cross-sectional view taken along line 2-2 in FIG. 1.
Figure 3:
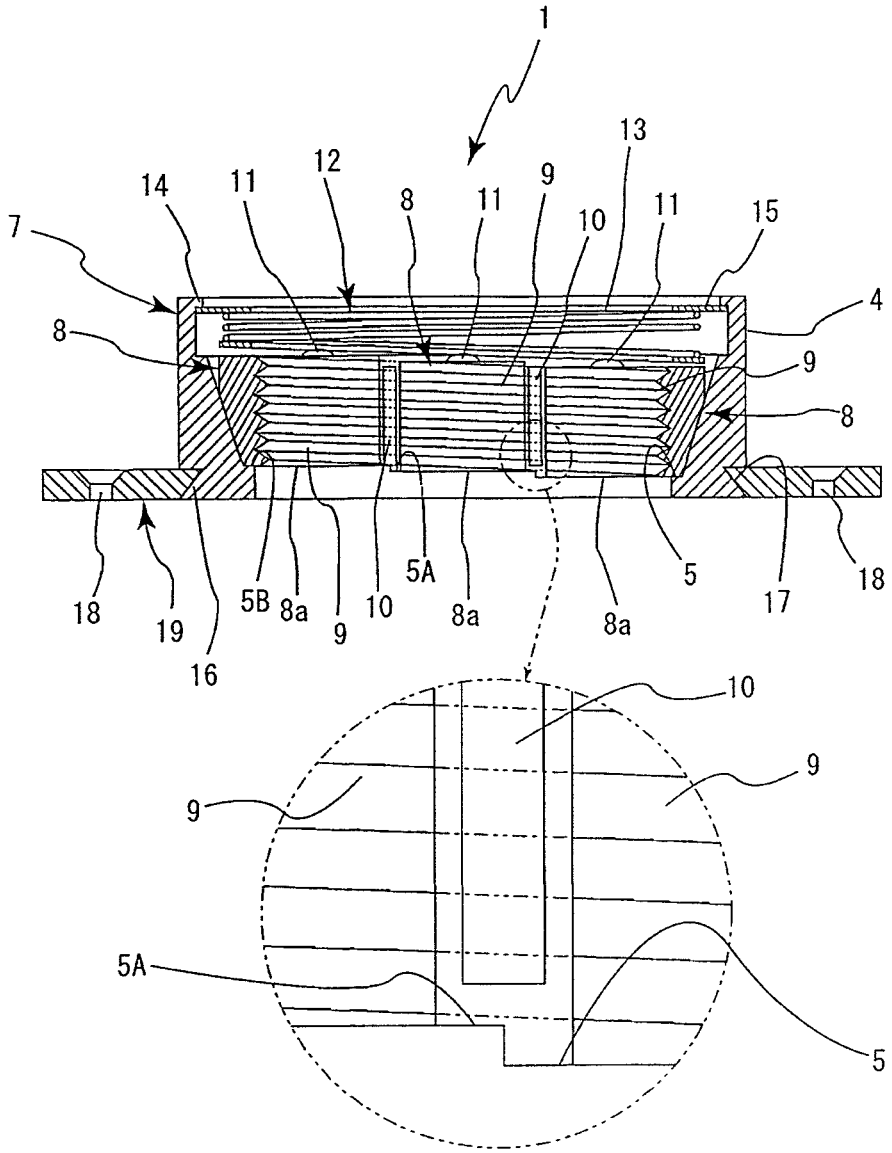
FIG. 3 is a development view of a nut main body, showing a steppe d portion according to the first embodiment for carrying out the present invention.
Figure 4:
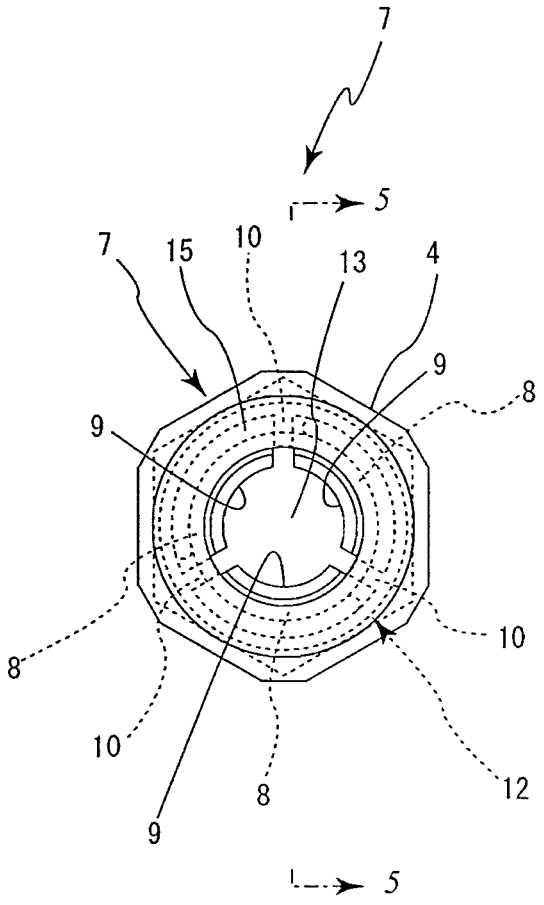
FIG. 4 is a planar view of the nut main body according to the first embodiment for carrying out the present invention.
Figure 5:
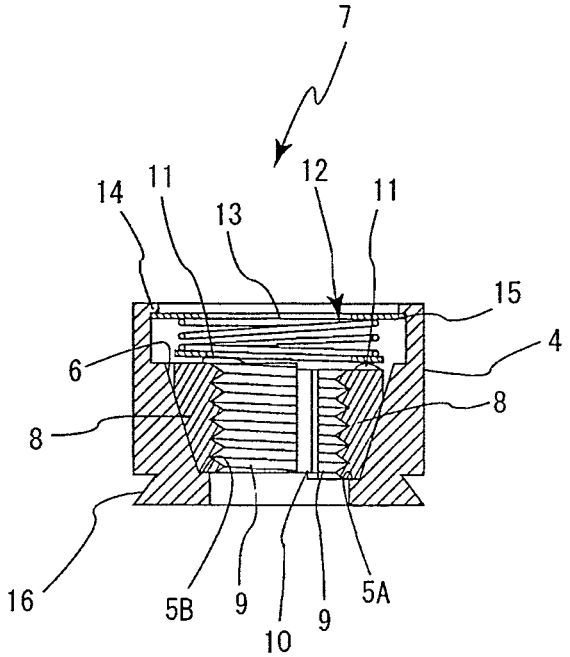
FIG. 5 is a cross-sectional view taken along line 5-5 in FIG. 4.
Figure 6:
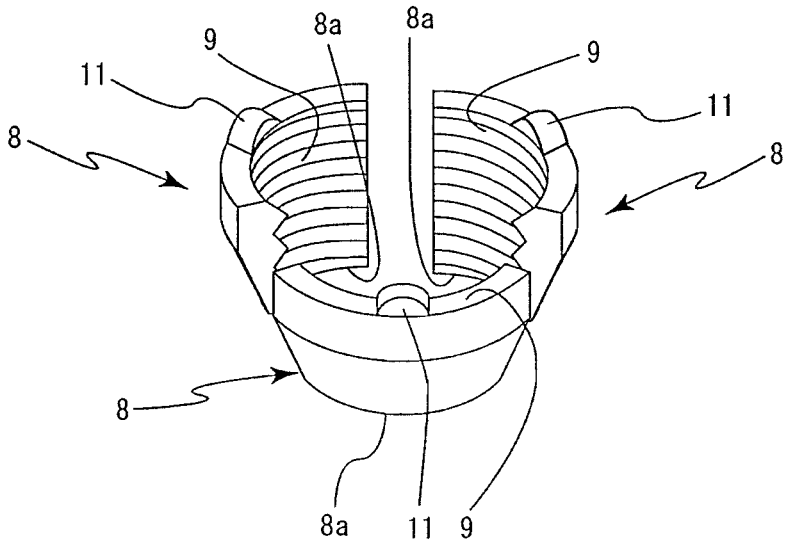
FIG. 6 is an explanatory diagram of nut segments according to the first embodiment for carrying out the present invention.
Figure 7:
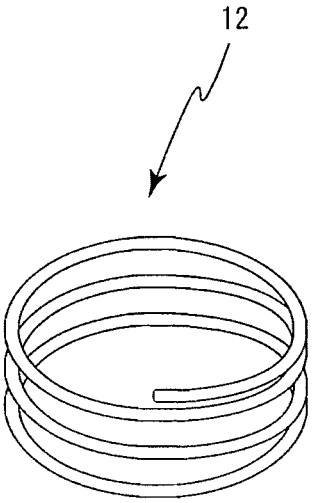
FIG. 7 is an explanatory diagram of a bias spring according to the first embodiment for carrying out the present invention.

1, 1A, 1B, 1C: thrust nut
2: bolt
3: screw portion
4: outer wall
5, 5A, 5b: stepped portion
6: slanted hole
7: nut main body
8: nut segment
9: screw portion
10, 10A: guide piece
11, 11A: projection piece
12, 12A: bias spring
12: bolt insertion hole
14: rivet
15: stopper piece
16: washer insertion piece
17: rivet
18: screw insertion hole
19, 19A: washer
20: wood member
21: bolt insertion hole
22: washer
23: screw
24: ring-shaped groove
25: engaging piece
26: washer

DETAILED DESCRIPTION OF THE PREFERRED EMBODIMENTS

The present invention will be described in detail based on embodiments for carrying out the present invention shown in the drawings.

According to a first embodiment for carrying out the present invention shown in FIG. 1 to FIG. 11, reference number 1 represents a thrust nut of the present invention that can be thrust onto a bolt 2 to a predetermined position, and screwed together with a right screw portion 3 of the bolt 2, thereby being fastened and fixed, by being rotated in a fastening direction from the predetermined position. The thrust nut 1 is configured by: a nut main body 7 of which an outer wall 4 has a polygonal shape that is hexagonal according to the first embodiment, the nut main body 7 having a slanted hole 6 of which the inner diameter becomes successively smaller and a small-diameter end portion is formed into two or more stepped portions that are three stepped portions 5, 5A, and 5B according to the first embodiment of the present invention; three nut segments 8, 8, and 8 that are slidable within the slanted hole 6 of the nut main body 7, of which small-diameter side end portions 8a, 8a, and 8a are in contact with the stepped portions 5, 5A, and 5B, and pressing projection pieces 11, 11, and 11 are formed in center portions of large-diameter side end portions 8b, 8b, and 8b; right screw portions 9, 9, and 9 that are formed on the inner wall surfaces of the three nut segments 8, 8, and 8 such as to be continuous with the nut segments 8 that are in contact with the stepped portion 5 having the smallest diameter; guide pieces 10, 10, and 10 that are formed in an axial-center direction on the inner wall surfaces at end portion positions of the stepped portions 5, 5A, and 5B in the slanted hole 6 of the nut main body 7, between the nut segments 8, 8, and 8; a washer 26 that is disposed above the pressing projection pieces 11, 11, and 11 of the nut segments 8, 8, and 8; a bias spring 12 that uses a coil spring attached within the nut main body 7 such as to urge the nut segments 8, 8, and 8 towards the small-diameter side at all times with the washer 26, and the pressing projection pieces 11, 11, and 11 therebetween; a washer-shaped stopper piece 15 that holds the bias spring 12 within the nut main body 7, in which a bolt insertion hole 13 is formed, and is prevented from falling out by a rivet 14 in an end portion of the nut main body 7; a ring-shaped washer insertion piece 16 that is formed in an end portion on the small-diameter side of the nut main body 7; and a washer 19 into which the washer insertion piece 16 is inserted, that has screw insertion holes 18 and 18, and of which the tip portion is rotatably attached by a rivet 17.

In the thrust nut 1 configured as described above, the nut segments 8, 8, and 8 are set within the slanted hole 6 of the nut main body 7. The pressing projection pieces 11, 11, and 11 of the nut segments 8, 8, and 8 are pressed by the biasing force of the bias spring 12 with the washer 26 therebetween. The end portions 8a, 8a, and 8a on the small-diameter side of the nut segments 8, 8, and 8 are set such as to be pressed into the stepped portions 5, 5A and 5B. As a result, the nut segments 8, 8, and 8 are automatically disposed by the stepped portions 5, 5A, and 5B such that right screw portions 9, 9, and 9 of the nut segments 8, 8, and 8 are screwed with the right screw portion 3 of the bolt 2 in a continuous state.

Figure 8:
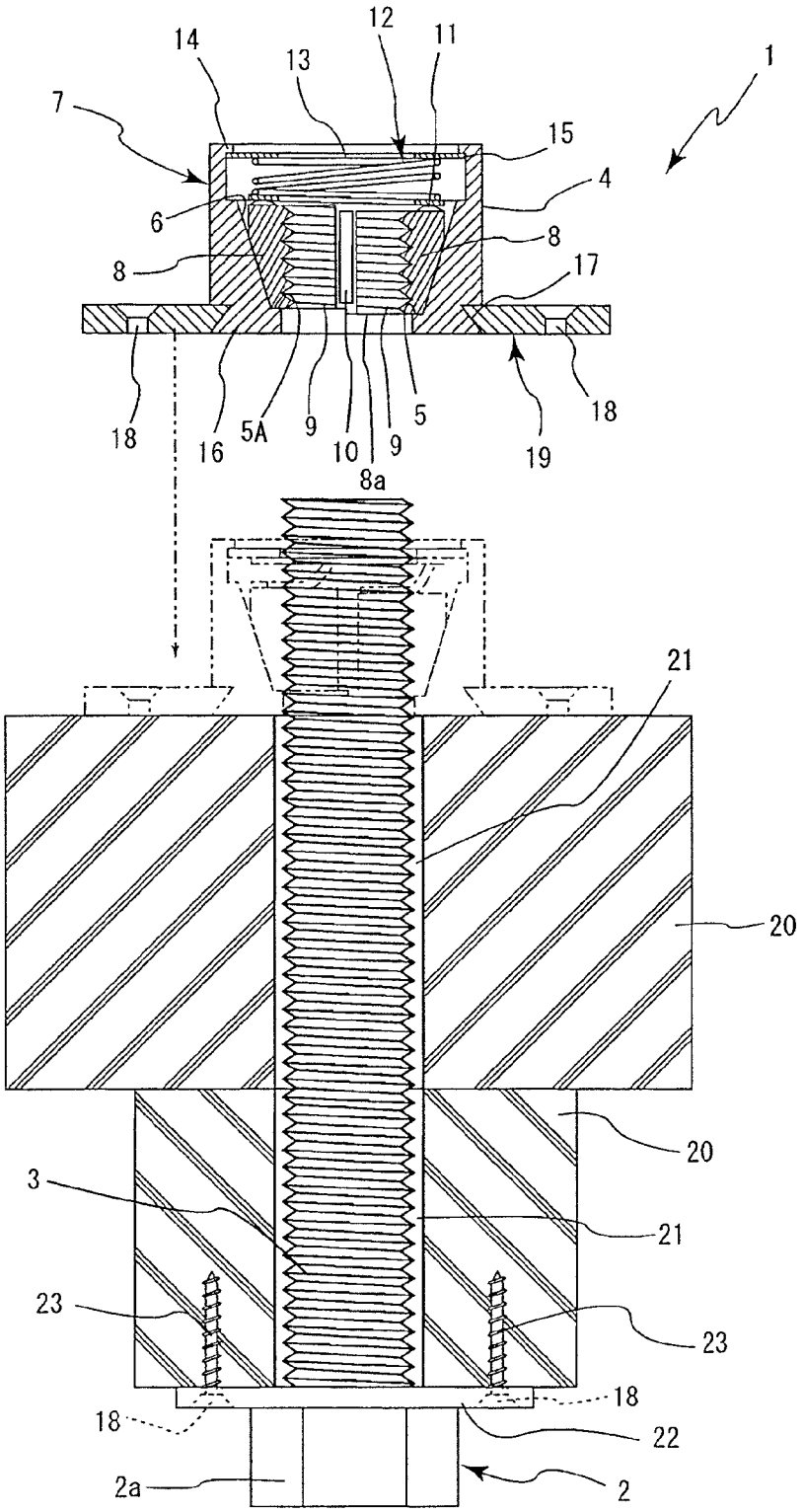
FIG. 8 is an explanatory diagram of a state in which a bolt is inserted according to the first embodiment for carrying out the present invention.
Figure 9:
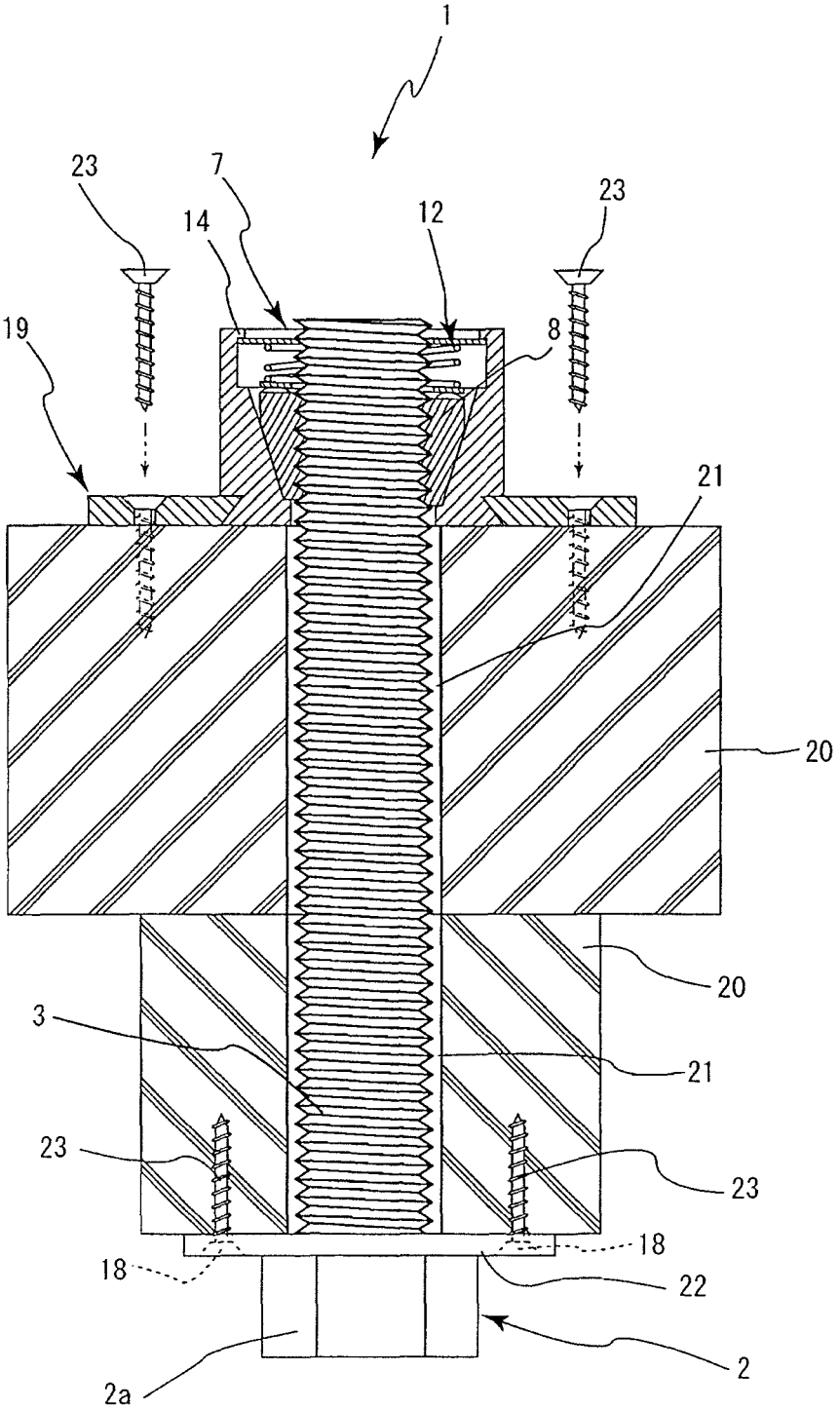
FIG. 9 is an explanatory diagram of a state in which a washer is fixed to a fastening member according to the first embodiment for carrying out the present invention.

In the thrust nut 1 assembled as described above, the bolt 2 is inserted into bolt holes 21 and 21 formed in wood members 20 and 20 that are fastening members to be connected as shown in FIG. 8. A washer 22 having screw insertion holes 18 and 18 is fixed to a head portion 2a of the bolt 2 by welding or the like. Screws 23 and 23 are inserted into the screw insertion holes 18 and 18 of the washer 22 and driven into the wood member 20, thereby fixing the washer 22 to the wood member 20. Thereafter, the thrust nut I is thrust onto the tip portion of the bolt 2 that projects from the bolt insertion hole 21. The screws 23 and 23 are inserted into the screw insertion holes 18 and 18 in the washer 19 as shown in FIG. 9 and driven into the wood member 20, thereby fixing the washer 19 to the wood member 20.

At this time, the nut segments 8, 8, and 8 within the nut main body 7 are pressed back against the biasing force of the bias spring 12 by the right screw portion 3 of the bolt 2. When the nut segments 8, 8, and 8 spread open, the bolt 2 smoothly passes through, and the thrusting of the thrust nut 1 is stopped, the biasing force of the bias spring 12 urges the nut segments 8, 8, and 8 towards the direction of the end portions 8a, 8a, and 8a on the small-diameter side, with the washer 26 and the pressing projection pieces 11, 11, and 11 of the nut segments 8, 8, and 8 therebetween. As a result, the nut segments 8, 8, and 8 are pressed back, with certainty, into to a position at which the right screw portion 3 of the bolt 2 and the right screw portions 9, 9, and 9 of the nut segments 8, 8, and 8 are screwed together.

Figure 10:
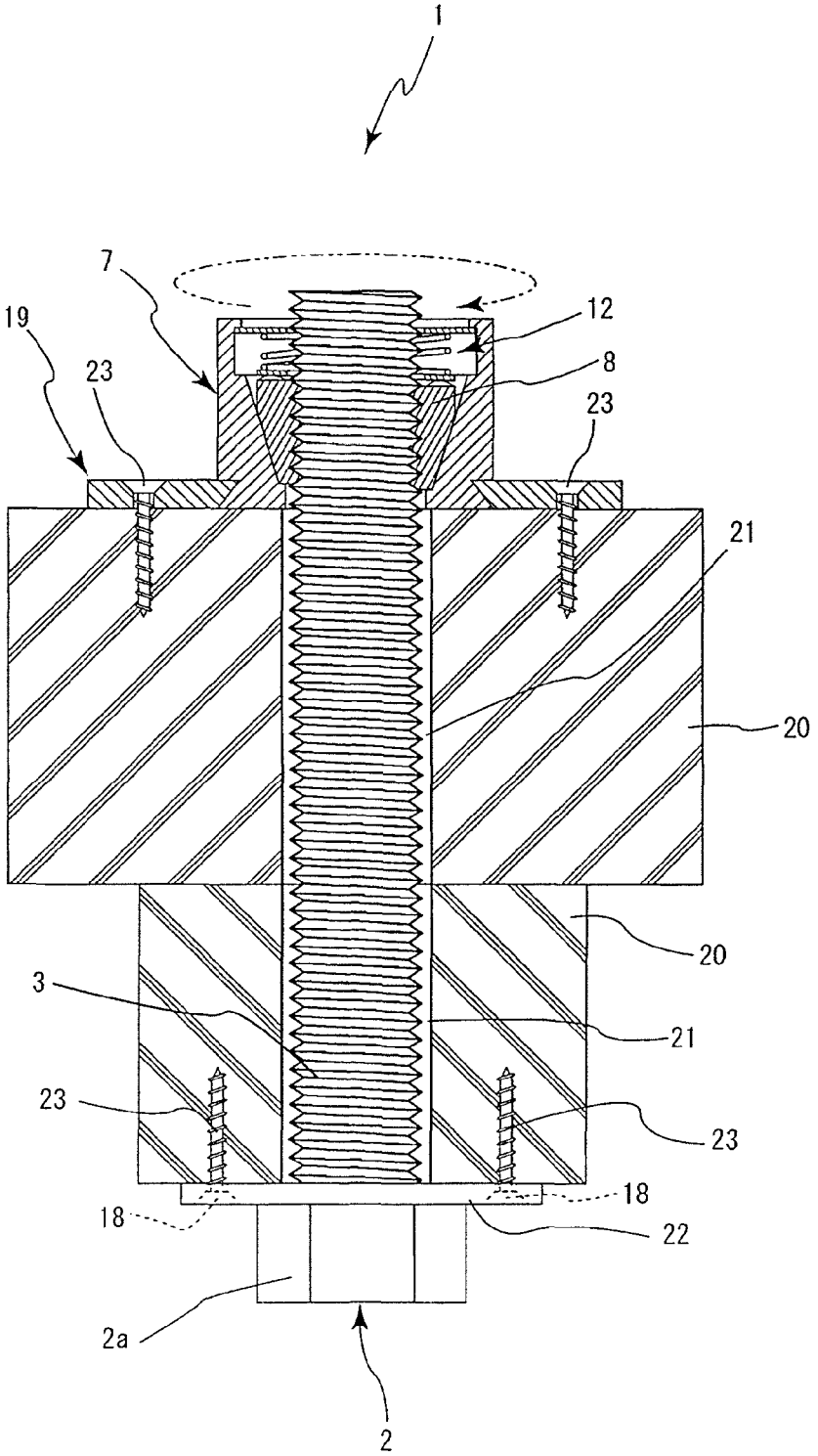
FIG. 10 is an explanatory diagram of a state in which the nut main body is rotated in a fastening direction, fastened, and fixed according to the first embodiment for carrying out the present invention.
Figure 11:
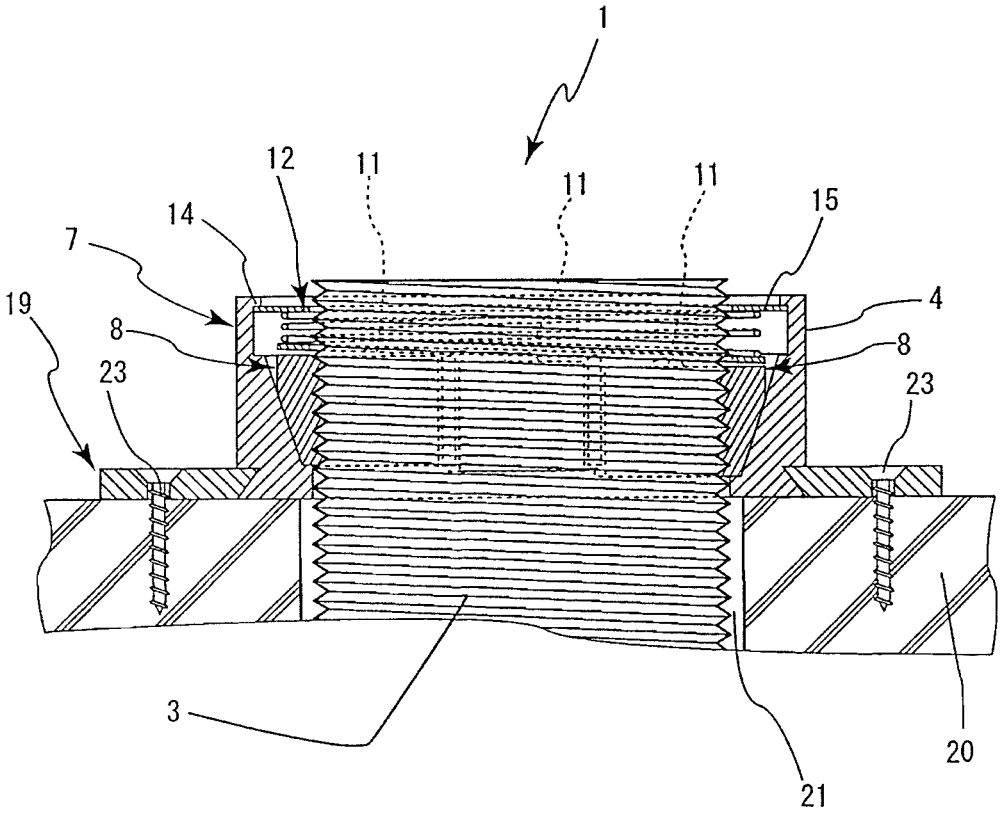
FIG. 11 is a development view of a state in which the bolt and the nut segments are screwed together according to the first embodiment for carrying out the present invention.

In this state, when the nut main body 7 is rotated in the fastening direction as shown in FIG. 10, the nut segments 8, 8, and 8 are each urged towards the direction of the end portions 8a, 8a, and 8a on the small-diameter side with certainty by the biasing force of the bias spring 12, as shown in FIG. 11. The right screw portion 3 of the bolt 2 and the right screw portions 9, 9, and 9 of the nut segments 8, 8, and 8 are screwed together such as to be continuous, and the nut main body 7 can be fastened and fixed.

In an instance in which the wood members 20 and 20 that are fastening members contract during fastening and fixing, the nut main body 7 moves in the contracting direction via the washer 19. Therefore, the biasing force of the bias spring 12 is transmitted to the pressing projection pieces 11, 11, and 11 of the nut segments 8, 8, and 8 via the washer 26. The nut segments 8, 8, and 8 can be moved in the fastening direction with certainty, and automatically tightened.

[Other Embodiments for Carrying out the Invention]

Next, other embodiments for carrying out the present invention, shown in FIG. 12 to FIG. 20, will be described. In the description of the other embodiments for carrying out the present invention, constituent components that are the same as those according to the first embodiment for carrying out the present invention are given the same reference numbers. Redundant descriptions are omitted.

Figure 12:
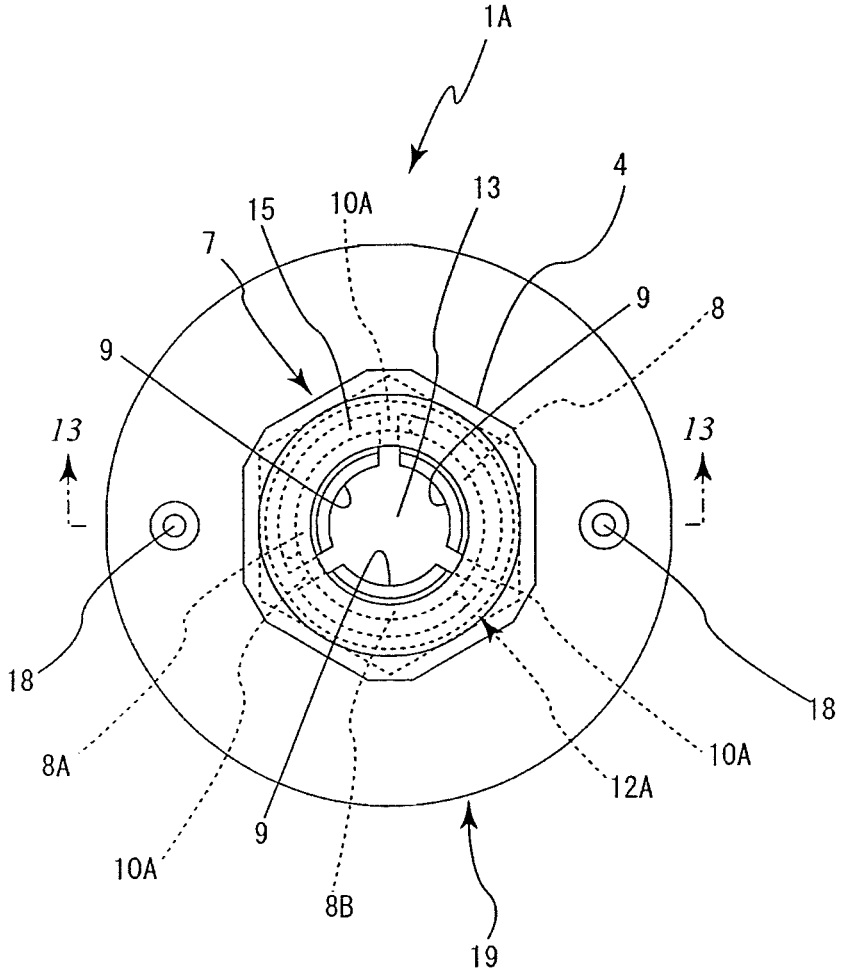
FIG. 12 is a planar view of a second embodiment for carrying out the present invention.
Figure 13:
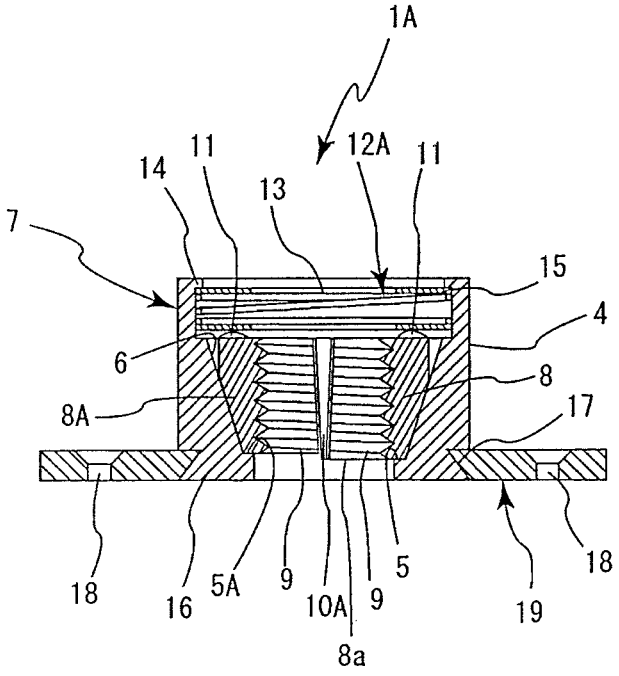
FIG. 13 is a cross-sectional view taken along line 13-13 in FIG. 12.
Figure 14:
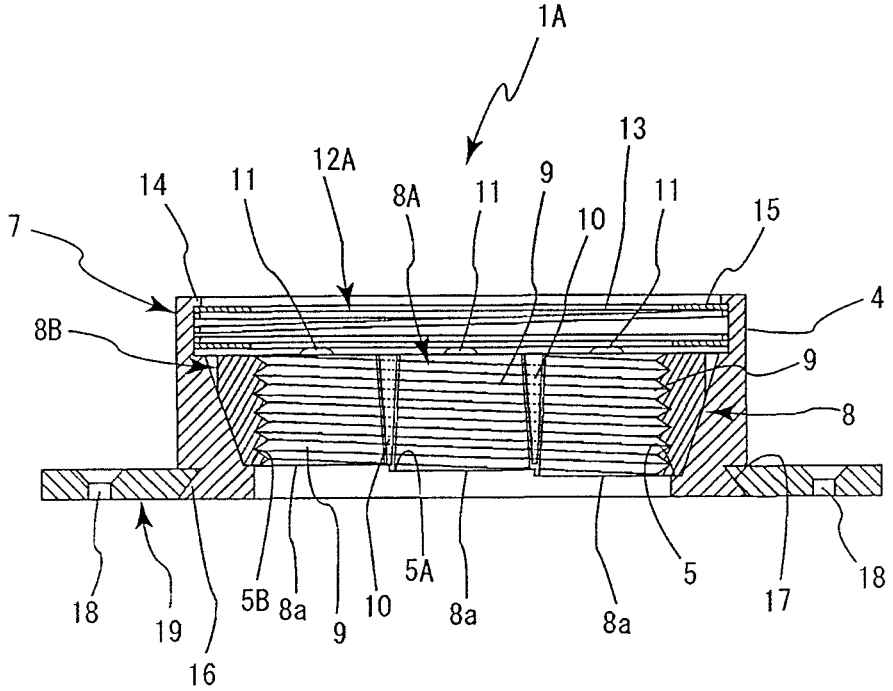
FIG. 14 is a development view of a stepped portion according to the second embodiment for carrying out the present invention.

According to a second embodiment for carrying out the present invention shown in FIG. 12 to FIG. 14, the main difference with the first embodiment for carrying out the present invention is that nut-segments 8, 8A, and 8B, and wedge-shaped guide pieces 10A, 10A, and 10A are used. The upper end portions of the nut-segments 8, 8A, and 8B are on substantially the same plane in a state in which the nut segments 8, 8A, and 8B are housed within the slanted hole 6 of the nut main body 7. The guide pieces 10A, 10A, and 10A reduce the allowance of the nut segments 8, 8A, and 8B. A thrust nut 1A that is configured using the nut segments 8, 8A, and 8B, formed as described above, achieves working effects similar to those according to the first embodiment for carrying out the present invention. In addition, the biasing force of the bias spring 12 can he evenly transmitted to the nut segments 8, 8A, and 8B.

Figure 15:
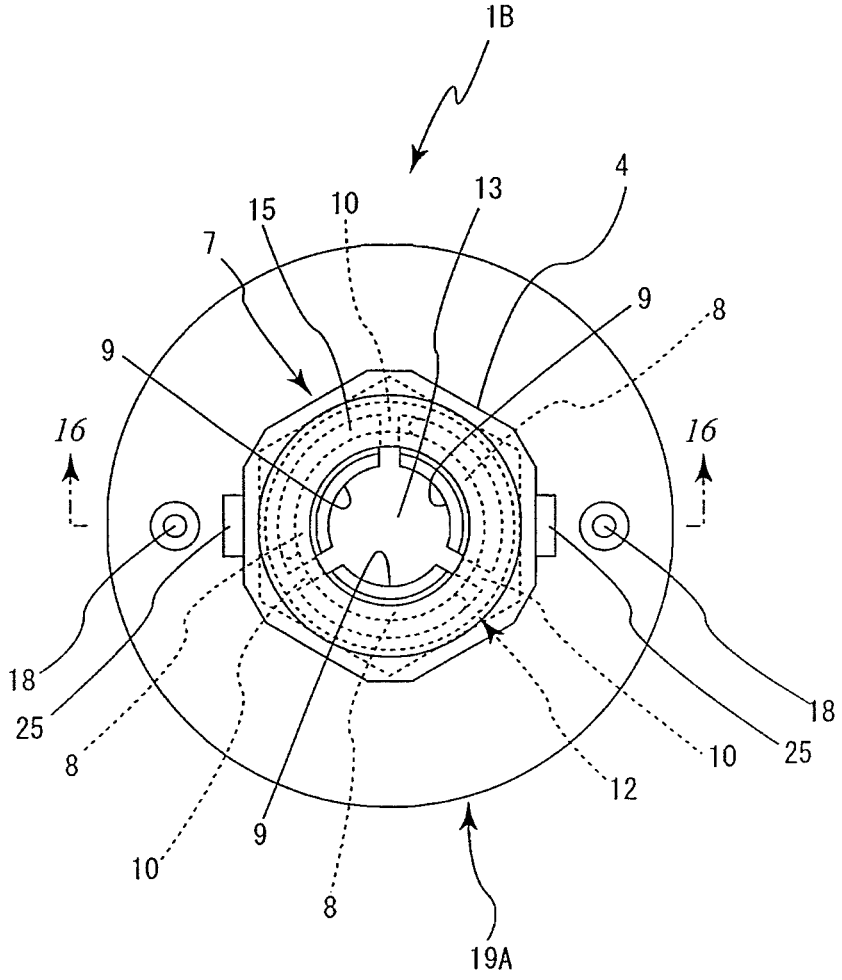
FIG. 15 is a planar view of a third embodiment for carrying out the present invention.
Figure 16:
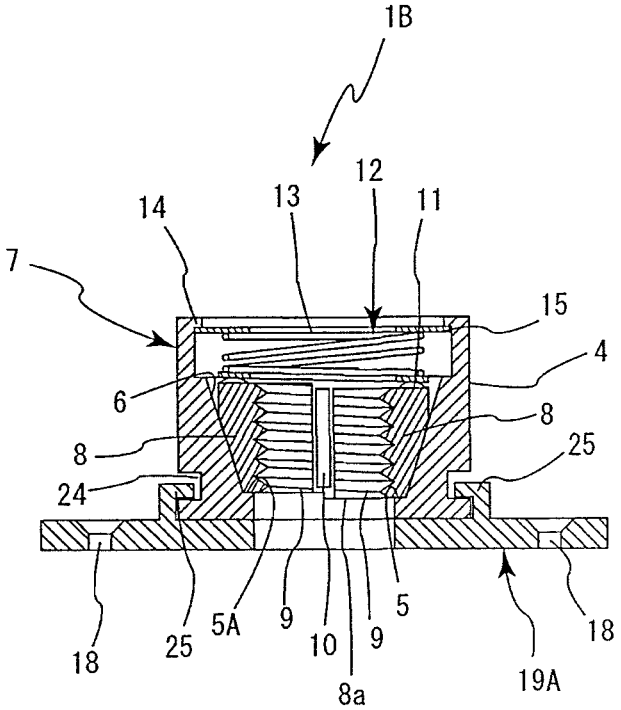
FIG. 16 is a cross-sectional view taken along line 16-16 in FIG. 15.
Figure 17:
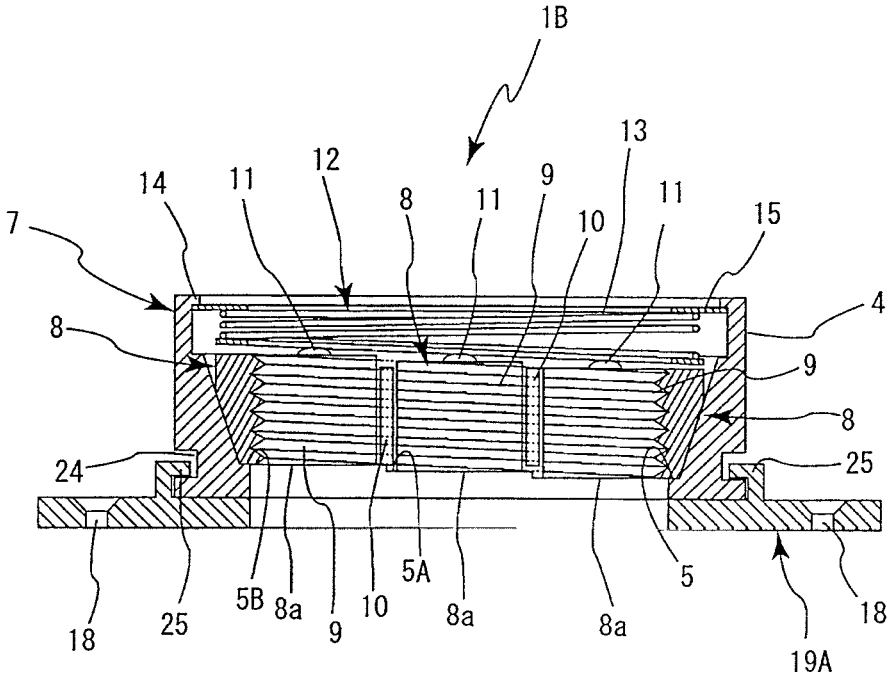
FIG. 17 is a development view of a stepped portion according to the third embodiment for carrying out the present invention.

According to a third embodiment for carrying out the present invention shown in FIG. 15 to FIG. 17, the main difference with the first embodiment for carrying out the present invention is that a ring-shaped groove 24 is formed in an outer circumferential portion of the nut main body 7 on the small-diameter side, and a washer 19A is used in which reverse L-shaped engaging pieces 25 and 25 are formed. The engaging pieces 25 and 25 are engaged with the nut main body 7 in areas opposing the ring-shaped groove 24. A thrust nut 1B that is configured using the nut main body 7 in which the ring-shaped groove 24 is formed and the wisher 19A, formed as described above, can also achieve working effects similar to those according to the first it for carrying out the present invention.

Figure 18:
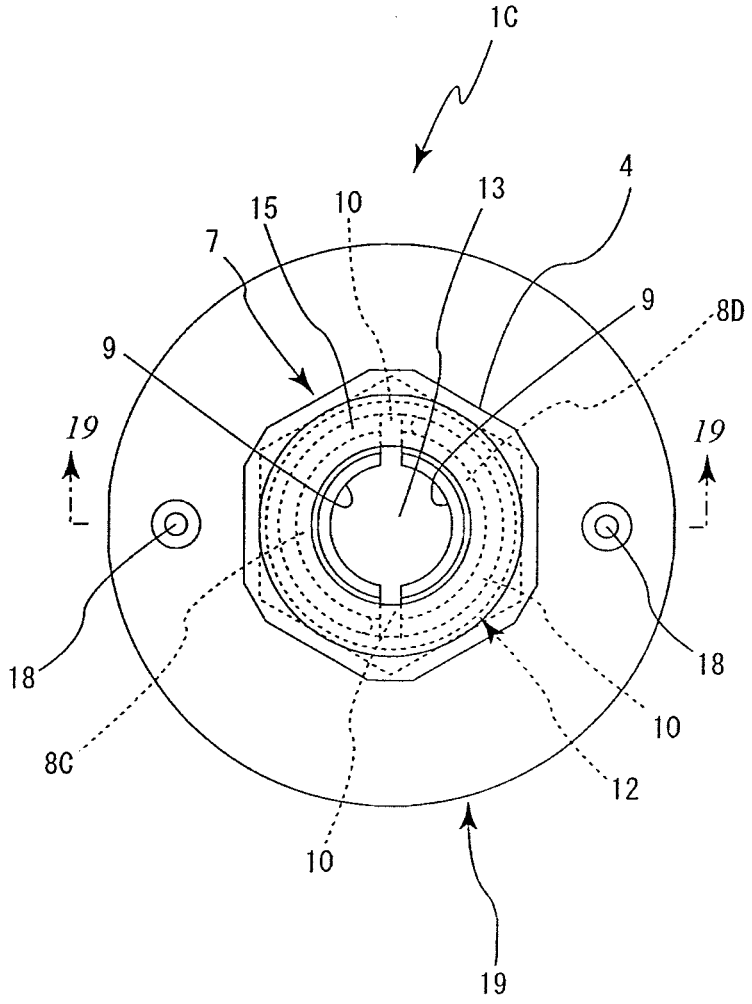
FIG. 18 is a planar view of a fourth embodiment for carrying out the present invention.
Figure 19:
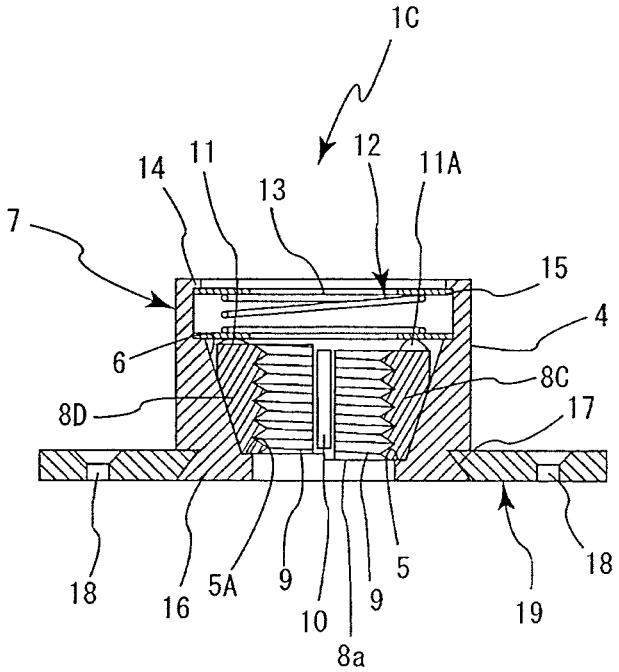
FIG. 19 is a cross-sectional view taken along line 19-19 in FIG. 18.
Figure 20:
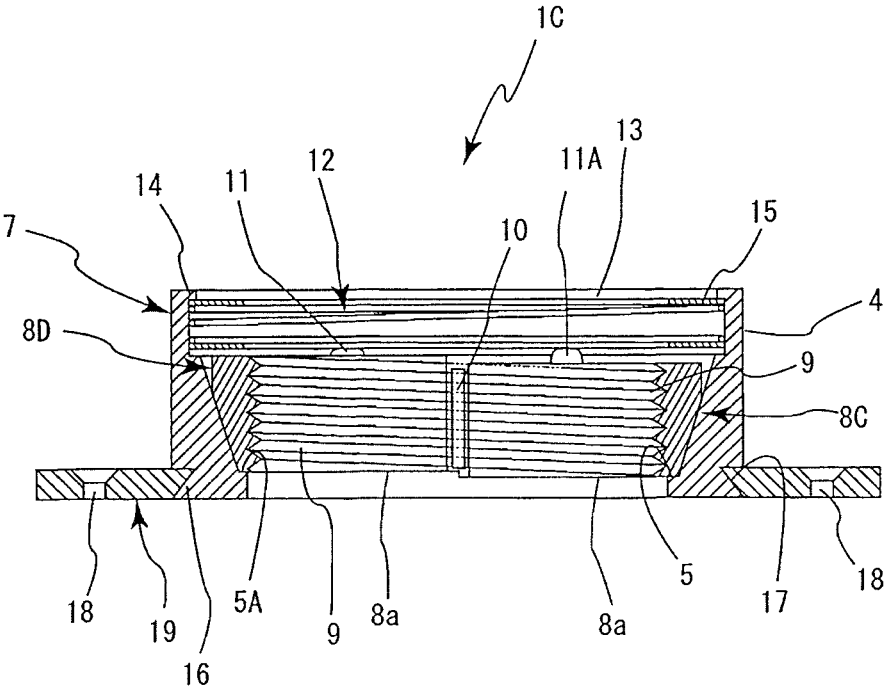
FIG. 20 is a development view of a stepped portion according to the fourth embodiment for carrying out the present invention.

According to a fourth embodiment for carrying out the present invention shown in FIG. 18 to FIG. 20, the main difference with the first embodiment for carrying out the present invention is that two stepped portions 5 and SA are formed in the small-diameter end portion of the slanted hole 6 of the nut main body 7, and pressing projection pieces 11 and 11A are formed that have differing heights, of which the lower end portions come into contact with the two stepped portions 5 and 5A, and the upper surfaces are on a same plane in the center portions of the large-diameter end portions 8b and 8b. In addition, two nut segments 8C and 8C are used that rotate integrally with the nut main body 7. A thrust nut 1C that is configured using the two nut segments 8C and 8D in this way can also achieve working effects similar to those according to the first embodiment for carrying out the present invention.

The stopper piece may be formed into a cylindrical shape as in Japanese Laid-Open Patent Publication No 2012-47244. The stopper piece may be fitted and fixed such as to cover the nut main body 7, or may be fixed to the nut main body 7 by an adhesive or by welding.

In addition, although use of the bolt 2 in which the right screw portion 3 is formed is described, the present invention is not limited thereto. The thrust nut may be configured such that a bolt on which a left screw portion is formed can be used, by using nut segments in which left screw portions are formed that can be screwed together with the left screw portion of the bolt.

According to the embodiments of the present invention, a thrust nut in which the nut main body is integrally formed is described. However, the present invention is not limited thereto. Similar working effects can be achieved even with a nut main body configured by an inner cylinder member of which the inner diameter becomes successively smaller and in which two or more stepped portions are formed in the small-diameter end portion, and an outer cylinder member of which the outer wall is formed into a polygonal shape, as disclosed in Japanese Laid-Open Patent Publication No. 2012-47244.

In addition, according to the embodiments of the present invention, materials of the components are not specified. However, materials that can be used for a nut, such as an iron material, various alloys, synthetic resin materials, carbon fiber materials, are selectively used.

Industrial Applicability

The present invention is used in an industry for manufacturing a thrust nut that is screwed together with a screw portion of a bolt by being rotated in a fastening direction after the bolt is inserted to a predetermined position.

What is claimed is:

1. A [thrust] nut comprising:

a [nut] main body [of which an outer wall is formed into a polygonal shape and] that has a slanted hole of which an inner diameter becomes successively smaller, and a small-diameter end portion having about a circumference of said small-diameter end portion a plurality of stepped portions of differing height so that said slanted hole has a differing depth relative to a large-diameter end portion of the slanted hole at a plurality of locations about a circumference of the slanted hole, *the stepped portions having end portion positions that are adjacent to each other*;

a plurality of [nut] segments that are slidable within the slanted hole of the [nut] main body, each one of the plurality of [nut] segments having a small-diameter side that comes into contact with at least one of said plurality of stepped portions[, and each one of the plurality of nut segments having a pressing projection piece formed at a large-diameter side of said one nut segment];

[a respective set of screw thread] *rod engaging* portions formed on an inner wall surface of each one of said plurality of [nut] segments[, said respective set occurring from said large diameter side to said small-diameter side of said one nut segment and including a thread portion extending to said small diameter side that is in contact with said at least one stepped portion];

[a washer that is provided at the large-diameter side of the plurality of nut segments]; and a [bias] spring that [is attached within the nut main body such as to urge] *urges* the plurality of [nut] segments towards the small-diameter side at all times [with the washer therebetween; and a stopper piece, in which a bolt insertion hole is formed, that holds the bias spring within the nut main body and is attached to the nut main body].

2. The [thrust] nut according to claim 1, wherein:

a plurality of guide pieces are formed on an inner wall surface of the [nut] main body that guide sliding of the plurality of [nut] segments in an axial-center direction.

3. The [thrust] nut according to any one of claim 1 or 2, wherein:

a washer capable of locking with a fastening member is fixed or rotatably attached to [a] *said* small-diameter end portion of the [nut] main body.

4. The [thrust] nut according to claim 2, wherein each one of said guide pieces extends axially along [an] *the* inner wall surface of said [nut] main body toward a corresponding stepped portion among said plurality of stepped portions at said small-diameter end portion of said [nut] main body.

*5. The nut according to claim 1, wherein the main body has an outer wall that is formed into a polygonal shape.*

*6. The nut according to claim 1, wherein each one of the plurality of segments has a projection formed at a large-diameter side of each one of said plurality of segments.*

*7. The nut according to claim 1, wherein the rod engaging portions formed on the inner wall surfaces of said plurality of segments are adapted to engage threads on a rod received by the nut.*

*8. The nut according to claim 1, wherein the rod engaging portions formed on the inner wall surface of each one of said plurality of segments occur from said large-diameter side to said small-diameter side of each one of said plurality of segments.*

*9. The nut according to claim 1, wherein the rod engaging portions formed on the inner wall surface of each one of said plurality of segments include a thread portion extending to said small-diameter side that is in contact with at least one of said plurality of stepped portions.*

*10. The nut according to claim 1, wherein a washer is provided at the large-diameter side of the plurality of segments and the washer is disposed between said plurality of segments and said spring.*

*11. The nut according to claim 1, wherein a stopper piece is provided that holds the spring within the main body.*

*12. The nut according to claim 1, wherein the spring is substantially disposed within the nut main body.*

*13. The nut according to claim 2, wherein the guide pieces are wedge-shaped.*

*14. The nut according to claim 6, wherein the projections have differing heights.*

*15. The nut according to claim 1, wherein the rod engaging portions formed on the inner wall surfaces of said plurality of segments comprise grooves and ridges.*

*16. The nut according to claim 1, wherein the plurality of stepped portions are arranged about the circumference of the slanted hole in ascending order of said differing depths relative to the large-diameter end portion of the slanted hole.*

*17. An apparatus, comprising:*

*a. the nut according to claim 1;*

*b. a fastening member connected to another fastening member by a rod, with the nut fixed to the fastening member wherein one or more of the fastening members contract in a contracting direction along the rod; and*

*c. the rod is at least partially held within the slanted hole of the nut.*

*18. The nut according to claim 11, wherein the stopper piece is formed with a rod insertion hole.*

*19. The nut according to claim 15, wherein a plurality of guide pieces are formed on an inner wall surface of the main body that guide sliding of the plurality of segments in an axial-center direction.*

*20. The nut according to claim 2, wherein the rod engaging portions formed on the inner wall surfaces of said plurality of segments comprise grooves and ridges.*

* * * * *